Nov. 17, 1942.   J. C. WALLENMEYER ET AL   2,301,988
DISPENSING CLOSURE FOR STERILE LIQUID CONTAINERS
Filed March 10, 1941   2 Sheets-Sheet 1

Inventors:
John C. Wallenmeyer
Paul S. Prickett
By Bertha L. MacGregor
Attorney.

Nov. 17, 1942.  J. C. WALLENMEYER ET AL  2,301,988
DISPENSING CLOSURE FOR STERILE LIQUID CONTAINERS
Filed March 10, 1941  2 Sheets-Sheet 2

Inventors:
John C. Wallenmeyer
Paul S. Prickett
By Bertha L. MacGregor
Attorney

Patented Nov. 17, 1942

2,301,988

UNITED STATES PATENT OFFICE 2,301,988

DISPENSING CLOSURE FOR STERILE LIQUID CONTAINERS

John C. Wallenmeyer and Paul S. Prickett, Evansville, Ind., assignors to Mead Johnson & Company, Evansville, Ind., a corporation of Indiana Application March 10, 1941, Serial No. 382,472

12 Claims. (Cl. 128—214)

Our invention relates to dispensing closures for sterile liquid containers, particularly adapted for application to containers of intravenous solutions.

The object of the invention is to provide a container closure whereby sterile solutions may be maintained sterile for long periods of time and from which solutions may be drawn aseptically. A further object is to provide a means of filtering the air which replaces the vacuum in the container and which displaces the liquid when the solution is dispensed and to make this filter an integral part of the closure. A further object is to provide a means of compressing the filter medium at the time the air valve is opened, thereby increasing the effectiveness of the medium as a filter during withdrawal of the liquid, and at the same time limiting the degree of compression so as to insure an adequate rate of air flow.

A further object is to provide a valve to control the flow of air through the filter to the air tube, the valve being actuated manually. A further object is to provide an effective trap for liquids between the air tube and the filter to minimize effectively the possibility of the filter medium being wetted by the solution held in the container. A further object is to provide protection against contamination with dust and microorganisms during storage for the openings through which air is admitted to the filter. A further object is to provide a means of conducting air from the closure to a point inside and near the opposite end of the container (above the liquid level when the container is inverted) in order to eliminate air bubbling through the solution and to limit the quantity of solution capable of reaching the liquid trap. A further object is to affix the air tube to the closure in such a way as to insure adequate protection against breakage by shocks ordinarily encountered by the container in handling and in transit.

A further object is to provide a cap and vacuum tight seal for the liquid dispensing nozzle so that the nozzle will remain free of contamination. A further object is to provide a means whereby the removal of the liquid dispensing nozzle cap is prevented until the valve is opened to allow the vacuum in the container to be displaced with filtered air. A further object is to provide a means whereby removal of the valve control cap, by accident or through carelessness, is prevented, thereby eliminating the possibility of an air channel being created through the filter medium.

A further object is to design the closure in such form that its manufacture is simple and economical. Other specific objects and advantages will appear as the specification proceeds.

Figure 1:
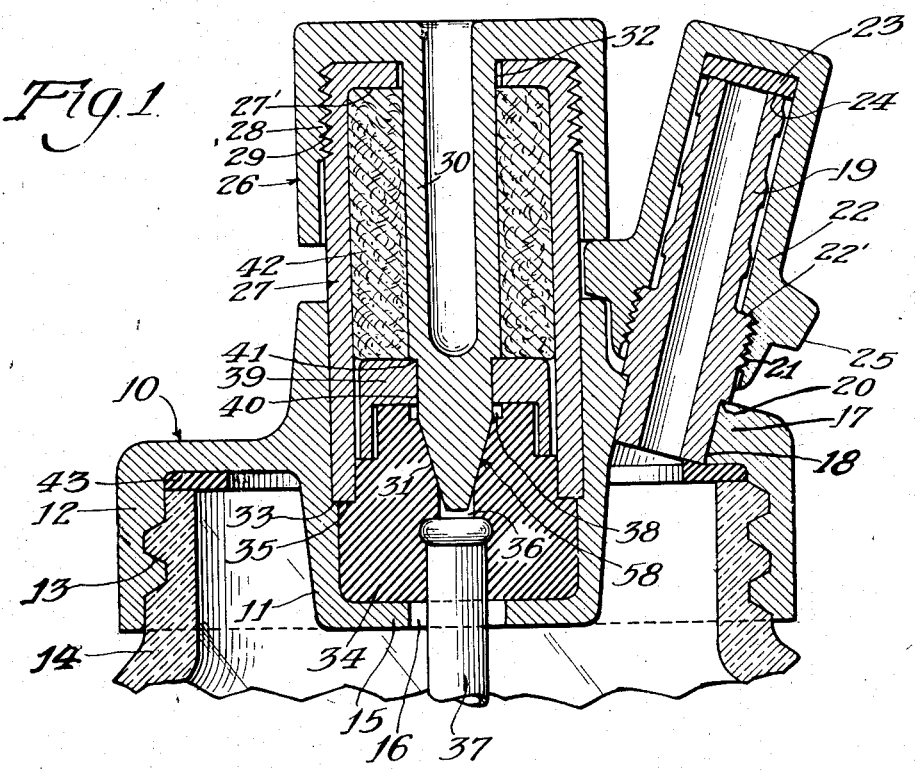
Fig. 1 is a vertical sectional view of the preferred embodiment of our invention, showing the dispensing closure applied to the neck of a container which is broken away.
Figure 2:
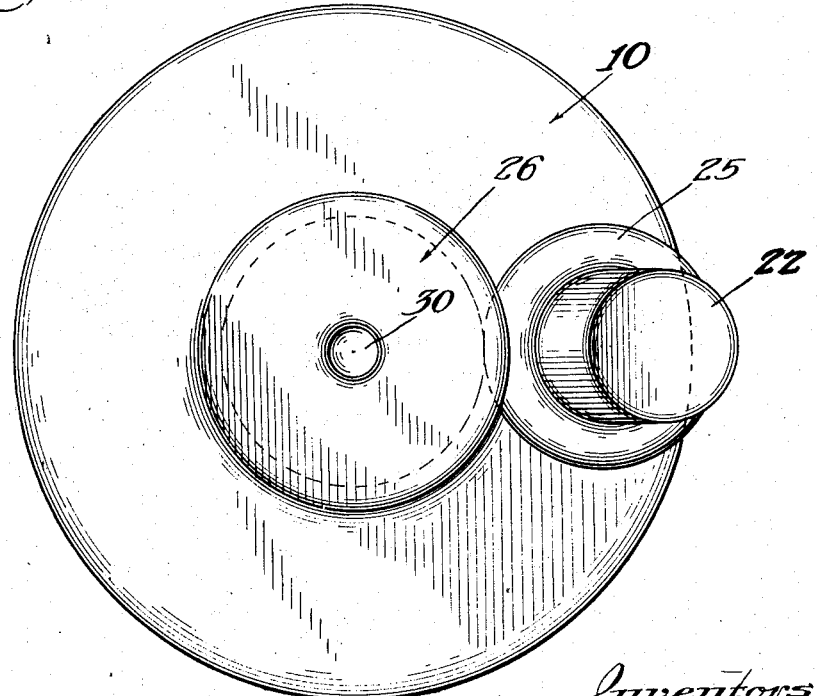
Fig. 2 is a plan view of the same.
Figure 3:
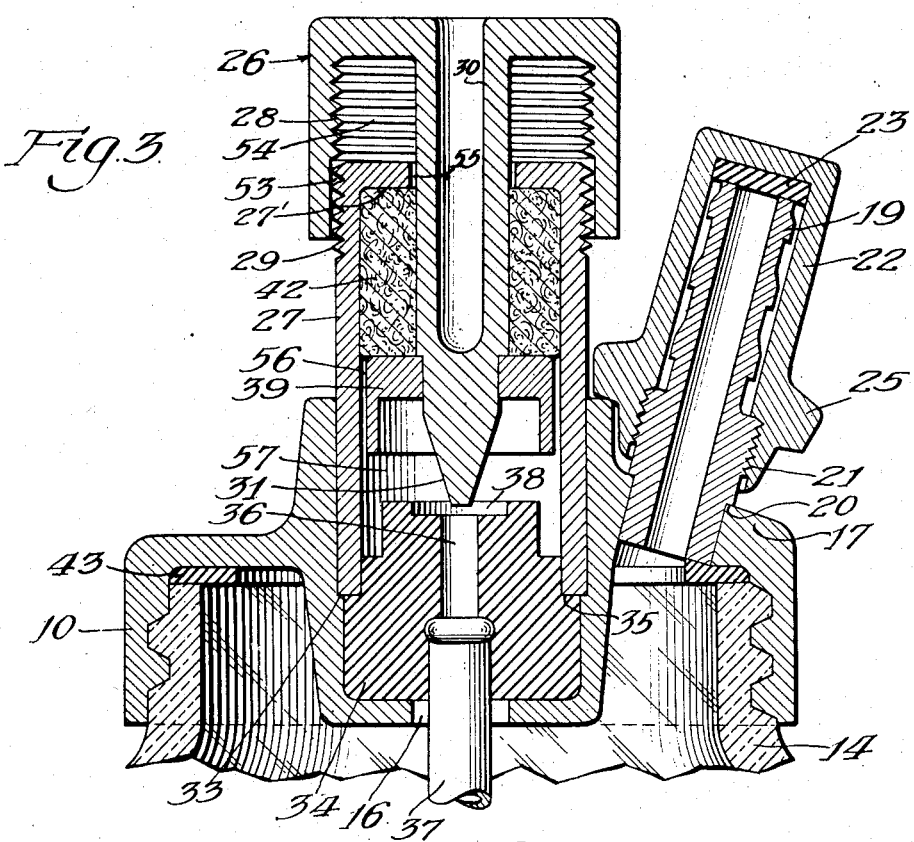
Fig. 3 is a view similar to Fig. 1 showing the air passage controlling valve in open position.

In the embodiment shown in Figs. 1 to 3, inclusive, the main body of the closure 10 consists of a screw cap having in the center a cylindrical well whose walls 11 are co-axial with the cylindrical portion 12 of the screw cap which has threads 13 to engage the threads of a container 14. The bottom 15 of the well is perforated by a round hole 16 in the center. The main body 10 is provided with a thick, beveled section 17 on one side through which a hole 18 is provided to permit the fitting therein of one end of a liquid dispensing nozzle 19. The nozzle 19 has a shoulder 20 which rests against the part 17. The liquid dispensing nozzle 19 is threaded at 21 in order to permit its protecting cap 22 to be screwed down until the resilient gasket 23 is compressed tightly between the dispensing end 24 of the nozzle 19 and the closed end of the protecting cap 22, thereby forming a vacuum tight seal. The flange 25 extends under the edge of a valve control cap 26 which prevents the unscrewing of the liquid dispensing nozzle cap 22 until the valve control cap 26 is unscrewed.

The valve control cap 26 is held in place on a filter cylinder 27 by threads 28 engaging the threads 29 of the filter cylinder 27, and has in its center a long cylinder 30 (either solid or hollow) tapered at the lower end 31. The filter cylinder 27 consists of a hollow cylinder fully open on the lower end and perforated by a single hole 32 at the opposite end slightly larger than the diameter of the tapered cylinder 30. The filter cylinder 27 is force fitted or cemented into the upper portion of the well wall 11 of the main body 10. The cylinder's position in the well is fixed by the shoulder 33 against which it is pressed during assembly.

A resilient plug 34 is fitted into the well and held in place by pressure of the lower edge of the filter cylinder 27 against a shoulder 35 and also by the vertical component of the force exerted by the tapered end 31 of the cylinder 30 when the valve control cap 26 is screwed down tightly. The vertical bore 36 through the resilient plug 34 serves as a receptacle for the flanged air tube 37. At its upper end 38 (Fig. 3), the vertical bore 36 serves as a valve seat for the tapered end 31 of the cylinder 30. The resilient plug 34 which holds the air tube 37 offers protection to the air tube against breakage by transverse shocks.

A liquid cup 39 is force fitted or cemented at 40 on the tapered cylinder 30 so that its shoulder rests against the shoulder 41 of the tapered cylinder 30. Fibrous filter medium is contained in the space formed by the parts 27, 30 and 39.

A resilient gasket 43 is provided for a vacuum tight seal between the neck of the container 14 and the main body 10 of the closure.

The complete closure is formed by combining two subassemblies. The dispensing nozzle 19 is fitted into the part 17 of the main body 10 by pressure. A cement may be applied to the inside surface of the hole 18 or the outside surface of the nozzle 19 or both, for the purpose of lubricating them during the force fitting operation and insuring a vacuum tight seal. The resilient gasket 23 is then properly placed in the nozzle cap 22, and the cap then screwed onto the nozzle 19 until the resilient gasket 23 is compressed and the cap 22 locked in place by friction of shoulders 22' of the dispensing nozzle 19 and cap 22. The resilient gasket 43 is placed in position in the closure body 10. Cement may be used to hold it in position. Next, the resilient plug 34 is fitted with the air tube 37 and placed in the well in the body 10. This completes the first sub-assembly.

The second sub-assembly consists of screwing the valve control cap 26 onto the filter cylinder 27, forcing a measured amount of fibrous filter medium 42 through the open end of the cylinder 27 against the shoulder 27' and force fitting the liquid cup 39 onto the tapered cylinder 30. Cement may be used on the tight fitting surfaces 40 to lubricate the pressure fitting and assure a liquid tight seal. It is preferable to use it only on the surface of the hole in the liquid cup 39 for the reason that no excess cement should be carried past the shoulder 41 and into contact with the filter medium 42.

The second sub-assembly is then force fitted or cemented into the first, so that the end of the filter cylinder 27 rests against the shoulder 33 in the well in the main body 10. When this is done, the tapered end 31 of the cylinder 30 enters the bore 36 of the resilient plug 34 and displaces the resilient material sufficiently to form a vacuum tight seal. The device is then ready for sterilization and use as a closure.

For convenience, all resilient parts 23, 34 and 43 of this device may be made of rubber. The main body 10, filter cylinder 27, liquid cup 39, valve control cap 26, nozzle cap 22 and nozzle 19 may be made of Bakelite, a thermosetting plastic material. The air tube 37 preferably is made of glass, and the fibrous filter medium 42 is absorbent cotton. The use of other materials in these parts is understood to be within the scope of this invention.

Figure 4:
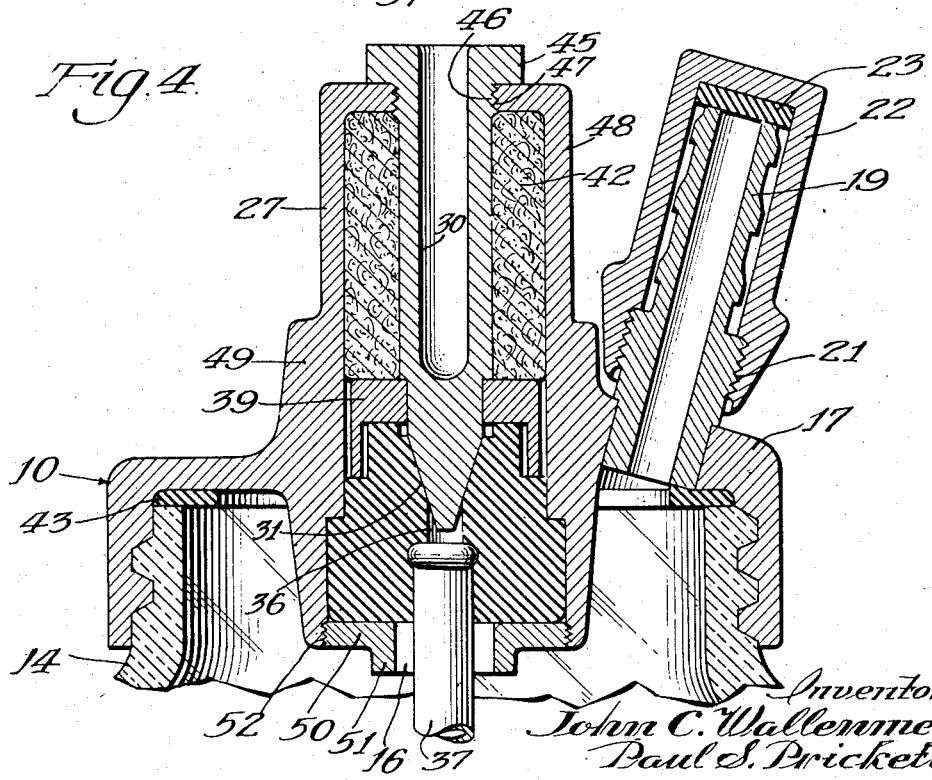
Fig. 4 is a vertical sectional view showing a modified form of construction embodying the invention.

In the modfiied form shown in Fig. 4, the air valve control cap is not held on the filter cylinder by engagement of threads 28 and 29, as in Fig. 1, the valve control member 45 (corresponding to the cap 26) being provided with threads 46 which engage threads 47 on the filter cylinder 48. The valve control member 45 is provided with a tapered cylinder 30 and liquid cup 39, as heretofore described.

Another modification shown in Fig. 4 is the making of the filter cylinder 48 and portion 49 of the closure body 10 integral. This change requires the bottom of the well in which the plug 34 is located to be open for insertion of the plug and therefore a plate 50 with nut 51 is provided for closing the well by engagement of the threads 52. In this modification, the skirt of the cap 26 having been eliminated, the flange 25 on the cap 22 cannot be engaged by said cap 26 and therefore may be reduced in size as shown in Fig. 4 or eliminated.

The constructions shown and described provide a container closure whereby sterile solutions may be maintained sterile for long periods of time and from which solutions may be dispensed aseptically, and they provide a means of filtering the air which replaces the vacuum in the container and which displaces the liquid when the solution is dispensed, said filter means being an integral part of the closure. Although it is desirable to provide a means of compressing the filter medium at the time the air valve is opened to increase the effectiveness of the medium, it is not absolutely necessary. A fibrous filter medium may be packed in the filter chamber and used as a filter without compression if a smaller margin of safety of the filter's efficiency is considered satisfactory. Eliminating either the filter cylinder's shoulder 27' or the liquid cup 39 will prevent compression of the filter medium 42 when the valve control cap 26 is unscrewed. If, however, either the shoulder 27' or liquid cup 39 is eliminated, it would be possible to withdraw completely, by accident or through carelessness, the valve control cap 26 when the threads 28 and 29 become disengaged, in which case a channel would be created through the fibrous filter medium or the filter medium removed completely, thereby permitting unfiltered air to enter the container. The liquid cup 39 is not essential if a decrease in the filter's efficiency, or a decrease in the rate of airflow through the filter are not considered important factors. As the wetting of the fibrous filter medium increases, the airflow through the medium decreases until one entire cross-sectional area becomes saturated, at which point the airflow may be stopped altogether. The presence of the liquid cup 39 or a retaining ring in lieu thereof is desirable in order to prevent the fibrous filter medium reaching the valve seat 38 in the rubber plug 34 and interfering with the seating of the tapered portion 31 in the portion 58 of said seat 38.

Certain obvious changes may be made without departing from the scope of our invention. For example, the nozzle 19 may be threaded on the lower end to engage threads in the main body of the closure 10 to permit a screwed fit instead of a cemented or force fitted connection. An advantage of a cemented or force fitted connection over a threaded connection is one of economy of manufacture. It is obvious that if the nozzle 19 were made a part of the main body 10, the function and operation of the closure described herein would not be altered.

As stated in the description of the device of Fig. 4, the flange 25 of the nozzle cap 22 is not essential to the function of the filter. It could be eliminated if all persons preparing the assembled container of solution for dispensation could be relied upon to follow directions to unscrew the valve control cap 26 before removing the nozzle cap 22. This flange makes incorrect preparation for dispensation extremely difficult if not impossible. If the flange 25 were eliminated, the hose nozzle cap 22 could be attached to the hose nozzle 19 at the upper end by threads, force fit or crimping (it a metal cap were used).

The air tube 37 may be mounted in the resilient plug 34 as shown, or it may be made a part of the body 10 or plate 50, but the form shown is preferred.

The air tube 37 is not absolutely necessary to the function of the closure. It is provided for the purpose of eliminating the bubbling of air through the solution, and to limit the quantity of solution capable of reaching the liquid trap. Without it, it is possible, under a number of conditions, for the liquid to overfill the liquid cup 39 and wet the filter medium to a point where the airflow through the filter medium would be seriously impeded if not stopped.

The plug 34 may be made of non-resilient material if it is cemented or force fitted into place, the air tube eliminated or cemented in place, and the valve seat 38 ground to a good fit or sealed by some suitable substance applied to the surfaces making contact when the valve control cap 26 is screwed down. A resilient plug is preferable from the standpoint of economy, ease of manufacture and ease of assembly.

It is understood that means other than screw threads may be employed to affix this closure to a container and that such other means are not beyond the scope of this invention.

The function of each of the closures shown is to filter all air entering the container 14 to which it is attached, preparatory to and during dispensation of the liquid therefrom, and to provide a dispensing hose connection so that the liquid may be conducted by means of a hose to any desired point below the level of the container. To dispense the liquid, the container is suspended in an inverted position so that the closure is at the lowest point of the container and closure assembly. The inverted container is then suspended at a position high enough to provide a head pressure of the liquid at the lower terminus of the hose sufficient to overcome resistance and back pressure so as to permit the optimum rate of dispensation.

To prepare our preferred form of closure for dispensation, while in an upright position, the valve control cap 26 is unscrewed until the threads 28 completely disengage threads 29. This permits air to pass through the channel 53 (Fig. 3) between the filter cylinder 27 and the valve control cap 26, through the channel 54 made by unscrewing the valve control cap 26, through the channel 55, through the fibrous filter medium 42, through channel 56, through channel 57 caused by unscrewing the valve control cap 26, thereby withdrawing the liquid cup 39 from contact with the resilient plug, through the hole 36 in the resilient plug 34 which is opened by the withdrawal of the tapered end 31 of the cylinder 30, and through the air tube 37 to a point inside the container near the end opposite from the closure. This operation permits the vacuum in the container to be displaced by filtered air. The hose nozzle cap 22 cannot be unscrewed and removed until the above operation is completed, by reason of the fact that the edge of the valve control cap 26 bears on the rib 25 of the nozzle cap 22, thereby exerting a locking force. Such an arrangement prevents the removal of the nozzle cap 22 before the vacuum in the container is displaced with filtered air, thereby preventing unsterile air from displacing the vacuum through the hose nozzle 19. After the valve control cap 26 has been unscrewed fully, the hose nozzle cap 22 is removed and a sterile hose (not shown) slipped over the hose nozzle 19, employing the usual precautions common in hospital practice to prevent contamination of both parts while effecting the connection. The entire container is then inverted and suspended in this position at the desired height for satisfactory dispensation.

If any liquid remained in the air tube 37, at this point it will run down and collect in the liquid cup 39, whose capacity is greater than the amount of liquid that can be held by the air tube 37 and bore 36 in the resilient plug 34, thereby preventing the wetting of the filter medium 42.

When the valve control cap 26 is unscrewed fully, the fibrous filter medium 42 is compressed between the liquid cup 39 and the shoulder 27' of the filter cylinder 27, thereby increasing the fibrous filter medium's efficiency as a bacterial filter. The degree of compression depends upon the amount of fibrous material used and the length of the threads 28 and 29. In this device, as much cotton is placed in the filter chamber as will remain without requiring a retaining force. The cotton is compressed to approximately ⅔ of its original volume by unscrewing the valve control cap 26 in our preferred design. The pressure of the fibrous filter medium 42 on the liquid cup 39 and the shoulder 27' of the filter cylinder 27 prevents the accidental withdrawal of the valve control cap 26 after threads 28 and 29 are completely disengaged by unscrewing the valve control cap 26.

To maintain the sterility of the sterile solution as it is dispensed, an air filtering device to remove microorganisms from the air before it enters the container has been found essential. We have found absorbent cotton, along with other substances studied, to be an efficient filtering medium, but it must be understood that our invention is not limited to the use of absorbent cotton only.

A series of experiments under controlled conditions were made in which various measured quantities of air were drawn through the filter in the completely assembled closure. In these experiments, both the rate of airflow through the closure and the contamination of the air entering the closure were varied over wide ranges, with particular emphasis on rates of airflow and amounts of air contamination that are very definitely in excess over what is commonly considered as satisfactory in hospital practice. For example, we investigated rates of airflow of the order of ¼ to ½ liter per minute with contaminated air that contained up to as many as 200,000 microorganisms per liter of air and found that the filter in the completely assembled closure removed all of the microorganisms from the air that passed through it. As the volume of the largest size commercial sales container for intravenous solutions is of the order of 2 liters, we also investigated the volume of contaminated air that the filter would handle and found that it would sterilize more than 20 liters of heavily contaminated air at the average rate of ⅓ liter per minute.

From these experiments it is seen that our fully assembled closure has ample ability to sterilize, by filtration, heavily contaminated air at faster rates and in larger quantities than are commonly employed in the usual technic for intravenous injection.

We claim:

1. A dispensing closure for sterile liquid containers comprising a closure body having means for engaging the neck of a container, a dispensing nozzle mounted in the closure body in communication with the interior of the body, a cap on the nozzle for closing it, a valve seat in the closure body, said seat and body having an opening therethrough, a filter medium holder connected to the closure body, said holder having an air inlet, a valve member adapted to engage said valve seat, means on the holder normally closing the air inlet in the filter medium holder and thereby retaining the valve member on its seat, and normally inaccessible filter medium in the holder between the valve seat and the air inlet closure, manipulation of said closure serving to open said air inlet and separate said valve member from its valve seat, thereby permitting passage of air through said filter medium and said opening in the valve seat and closure body.

2. A dispensing closure for sterile liquid containers comprising a closure body having means for engaging the neck of a container, a dispensing nozzle mounted in the closure body in communication with the interior of the body, a cap on the nozzle for closing it, a valve seat in the closure body, said seat and body having an opening therethrough, a filter medium holder connected to the closure body, said holder having an air inlet, a valve member adapted to engage said valve seat, means for closing the filter medium holder, means for retaining the valve member on its seat, an inverted cup in the filter holder, and filter medium in the holder between the cup and the air inlet of the filter holder, opening of said air inlet and separating of said valve member from its valve seat permitting passage of air through said filter medium and said opening in the valve seat and closure body.

3. A dispensing closure for sterile liquid containers comprising a closure body having means for engaging the neck of a container, a dispensing nozzle mounted in the closure body in communication with the interior of the body, a cap on the nozzle for closing it, a valve seat in the closure body, said seat and body having an opening therethrough, a filter medium holder connected to the closure body, said holder having an air inlet, a valve member having means for closing the air inlet to the filter holder and extending through the holder to the valve seat, and filter medium in the holder between the valve seat and air inlet of the holder, said filter medium being normally sealed by said valve member against communication with the air, actuating of the valve member away from its seat serving to open the air inlet of the filter holder, thereby permitting passage of air through said filter medium and said opening in the valve seat and closure body.

4. A dispensing closure for sterile liquid containers comprising a closure body having means for engaging the neck of a container, a dispensing nozzle mounted in the closure body in communication with the interior of the body, a cap on the nozzle for closing it, a valve seat in the closure body, said seat and body having an opening therethrough, a filter medium holder connected to the closure body, said holder having an air inlet, a valve member having means for closing the air inlet to the filter holder extending through the holder to the valve seat, an inverted cup on said valve member, and filter medium in the holder between said cup and air inlet of the holder, actuating of the valve member away from its seat serving to open the air inlet of the filter holder and permitting passage of air through said filter medium and said opening in the valve seat and closure body.

5. A dispensing closure for sterile liquid containers comprising a closure body having means for engaging the neck of a container, a dispensing nozzle mounted in the closure body in communication with the interior of the body, a cap on the nozzle for closing it, a valve seat in the closure body, said seat and body having an opening therethrough, a filter medium holder connected to the closure body, said holder having an air inlet, a valve member comprising a cap and a valve seat-engaging stem, a flange on the stem, the cap closing the filter medium holder and the stem extending from the cap through the holder to the valve seat, and filter medium in the holder between the said flange and the cap, actuating of the valve member away from its seat serving to compress the filter medium and to open the air inlet of the filter holder, thereby permitting passage of air through said filter medium and said opening in the valve seat and closure body.

6. A dispensing closure for sterile liquid containers comprising a closure body having means for engaging the neck of a container, a dispensing nozzle mounted in the closure body in communication with the interior of the body, a cap on the nozzle for closing it, a valve seat in the closure body, said seat and body having an opening therethrough, a filter medium holder connected to the closure body, said holder having an air inlet, a valve member having means for closing the air inlet to the filter holder extending through the holder to the valve seat, a shoulder extending inwardly from the filter holder at its inlet end, an inverted cup on said valve member, and filter medium in the holder between said cup and said shoulder on the holder, actuating of the valve member away from its seat serving to open the air inlet of the filter holder and to compress the filter medium between said up and said shoulder, and permitting passage of air through said compressed filter medium and said opening in the valve seat and closure body.

7. A dispensing closure for sterile liquid containers comprising a closure body having means for engaging the neck of a container, a dispensing nozzle mounted in the closure body in communication with the interior of the body, a cap on the nozzle for closing it, a resilient plug providing a valve seat in the closure body, said plug and body having an opening therethrough, an air tube inserted in said opening in the resilient plug and extending through the opening in the closure body, a filter medium holder connected to the closure body, said holder having an air inlet, a valve member adapted to engage said valve seat, means normally closing the air inlet in the filter medium holder, and thereby retaining the valve member on its seat, and filter medium in the holder between the plug and the air inlet closure, manipulation of said closure serving to open said air inlet and separate said valve member from its valve seat to permit passage of air through said filter medium and said opening in the valve seat and closure body.

8. A dispensing closure for sterile liquid containers comprising a closure body having means for engaging the neck of a container, a dispensing nozzle mounted in the closure body in communication with the interior of the body, a cap on the nozzle for closing it, a valve seat in the closure body, said seat and body having an opening therethrough, a filter medium holder connected to the closure body, said holder having an air inlet, a valve member comprising a cap and a valve seat-engaging stem, the cap closing the filter medium holder and the stem extending from the cap through the holder to the valve seat, and filter medium in the holder between the valve seat and the cap, said dispensing nozzle cap having means on its exterior engaged by the valve member cap when the latter is in the position in which it closes the filter medium holder and the nozzle cap is in nozzle closing position, whereby said nozzle cap cannot be removed until the valve member cap has been moved to open the filter holder.

9. A dispensing closure for sterile liquid containers comprising a closure body having means for engaging the neck of a container, a dispensing nozzle mounted in the closure body in communication with the interior of the body, means for sealing the dispensing nozzle, an air filtering device connected to the closure body, an air passageway through the filtering device and closure body, and manually operable means on the filtering device closing said passageway at opposite ends of said filtering device and normally sealing the interior of the filtering device against communication with the air.

10. A dispensing closure for sterile liquid containers comprising a closure body having means for engaging the neck of a container, a dispensing nozzle mounted in the closure body in communication with the interior of the body, means for sealing the dispensing nozzle, an air filtering device connected to the closure body, an air passageway through the filtering device and closure body, and manually operable means on the filtering device for closing said passageway, said manually operable means on the filter preventing opening of said nozzle sealing means until said manually operable means has been moved to open the air passage through the filtering device.

11. A dispensing closure for sterile liquid containers comprising a closure body having means for engaging the neck of a container, a dispensing nozzle mounted in the closure body in communication with the interior of the body, means for sealing the dispensing nozzle, an air filtering device connected to the closure body, an air passageway through the filtering device and closure body, manually operable means on the filtering device for closing said passageway, a resilient plug in the closure body having an air passageway communicating with the passageway in the filtering device and closure body, and a glass air tube seated in said resilient plug in communication with the passageway, said resilient plug having a seat formed therein for reception of the manually operable means on the filtering device for closing said passageway.

12. A dispensing closure for sterile liquid containers comprising a closure body having means for engaging the neck of a container, a dispensing nozzle mounted in the closure body in communication with the interior of the body, means for sealing the dispensing nozzle, an air filtering device connected to the closure body, an air passageway through the filtering device and closure body, manually operable means on the filtering device for closing said passageway, flanges on said air filtering device and manually operable closure means, and filter medium in the filtering device inaccessibly retained between said flanges.

JOHN C. WALLENMEYER.
PAUL S. PRICKETT.